(12) United States Patent
Hofmann et al.

(10) Patent No.: US 10,634,785 B2
(45) Date of Patent: Apr. 28, 2020

(54) OPTOELECTRONIC SENSOR AND METHOD OF DETECTING OBJECT INFORMATION

(71) Applicant: SICK AG, Waldkirch (DE)

(72) Inventors: Christoph Hofmann, Waldkirch (DE); Joachim Krämer, Waldkirch (DE); Jörg Sigmund, Waldkirch (DE)

(73) Assignee: SICK AG, Waldkirch (DE)

( * ) Notice: Subject to any disclaimer, the term of this patent is extended or adjusted under 35 U.S.C. 154(b) by 133 days.

(21) Appl. No.: 15/815,982

(22) Filed: Nov. 17, 2017

(65) Prior Publication Data

US 2018/0143319 A1  May 24, 2018

(30) Foreign Application Priority Data

Nov. 24, 2016 (DE) .................. 10 2016 122 712

(51) Int. Cl.

| | | |
|---|---|---|
| *G01V 8/12* | (2006.01) | |
| *G01S 17/04* | (2020.01) | |
| *G01S 7/497* | (2006.01) | |
| *G01S 7/481* | (2006.01) | |
| *G01S 7/486* | (2020.01) | |
| *G01S 7/4912* | (2020.01) | |
| *G01S 17/08* | (2006.01) | |
| *G01V 8/10* | (2006.01) | |

(52) U.S. Cl.
CPC ............ *G01S 17/04* (2020.01); *G01S 7/4816* (2013.01); *G01S 7/4868* (2013.01); *G01S 7/497* (2013.01); *G01S 7/4918* (2013.01); *G01S 17/08* (2013.01); *G01V 8/10* (2013.01); *G01V 8/12* (2013.01)

(58) Field of Classification Search
CPC ........... G01V 8/12; G01V 8/10; G01S 17/026
See application file for complete search history.

(56) References Cited

U.S. PATENT DOCUMENTS

| | | | |
|---|---|---|---|
| 2014/0307252 A1 | 10/2014 | Hinderling et al. | |
| 2015/0268481 A1* | 9/2015 | Strohmeier | H04N 5/2254 |
| | | | 348/294 |

(Continued)

FOREIGN PATENT DOCUMENTS

| | | |
|---|---|---|
| DE | 2813089 A1 | 10/1979 |
| DE | 3216313 A1 | 11/1983 |

(Continued)

OTHER PUBLICATIONS

German Office Action dated Jun. 29, 2017 corresponding to application No. 102016122712.9.

(Continued)

*Primary Examiner* — Thanh Luu
(74) *Attorney, Agent, or Firm* — Nath, Goldberg & Meyer; Jerald L. Meyer; Stanley N. Protigal

(57) ABSTRACT

An optoelectronic sensor (10) is provided for detecting object information from a monitored zone (12) having a light receiver (24); a reception optics (22) associated with the light receiver (24) for generating a light spot on the light receiver (24); and an evaluation unit (26) for generating the object information from a received signal of the light receiver (24). In this respect, a manipulation unit (30) is provided to vary the reception optics (22), the light receiver (24) and/or elements of the reception optics (22) such that the portion of the light spot that is incident on the light receiver (24) varies.

12 Claims, 2 Drawing Sheets

(56) References Cited

U.S. PATENT DOCUMENTS

2015/0271386 A1* 9/2015 Schneider ............ H04N 5/2254
348/349
2016/0238631 A1* 8/2016 Aharoni ................. G01Q 20/02

FOREIGN PATENT DOCUMENTS

| DE | 4415944 A1 | 11/1995 |
| DE | 102005015500 A1 | 10/2005 |
| EP | 1947477 A1 | 7/2008 |
| EP | 2071367 A1 | 6/2009 |
| EP | 2189805 A1 | 5/2010 |
| EP | 2924477 A1 | 9/2015 |

OTHER PUBLICATIONS

"Using Extension Tubes"; Extension Tubes in Macro Photography; May 13, 2019. pp. 1-4.

Laskaris, Nikolaos "Vignetting"; School of Informatics, University of Edinburgh; Dec. 19, 2011.

* cited by examiner

OPTOELECTRONIC SENSOR AND METHOD OF DETECTING OBJECT INFORMATION

FIELD

The invention relates to an optoelectronic sensor for detecting object information from a monitored zone having a light receiver; a reception optics associated with the light receiver for generating a light spot on the light receiver; and an evaluation unit for generating the object information from a received signal of the light receiver and to a method of detecting object information from a monitored zone in which a reception optics generates a light spot on a light receiver and a received signal of the light receiver is evaluated to acquire the object information.

BACKGROUND

Many optoelectronic sensors generate a received signal from a light spot on their light receiver and evaluate it. As a rule, it is a light spot of an associated light transmitter. In some sensors such as through-beam sensors, the light transmitter is installed at a distance. With reflection light barriers or sensors according to the scanning principle, the light transmitter is located at the light receiver. A light beam is transmitted into the monitored zone and the light beam reflected by objects or by a separately set up reflector is received again. The distance can also be measured by a determination of the time of flight in this respect. A distance measurement is also possible by triangulation, wherein the light transmitter and the light receiver are arranged offset at a base distance such that the light spot migrates over the light receiver in dependence on the distance. The previously named one-dimensional sensors can be extended to include surface scanning or spatial scanning, for example by a multiple arrangement in a light grid or by moving the light beam such as in a light scanner.

A number of optical sensors are exposed to large reception dynamics, i.e. the intensity of the light spot fluctuates considerably within the measurement scene. In this respect, measurement distances and remissions of the respective remitting object that vary in particular play a role. A plurality of decades lie between a distant, dark object and a near, reflective or shiny object with a corresponding angle of incidence. Sensors should cover a dynamic range that is as large as possible for a reliable measurement. This region is practically restricted by the noise at the lower end and is restricted by overmodulation effects or saturation at the upper end.

A number of conventional measures are known to expand the dynamic range. One variable is the gain of the light receiver by which the sensitivity is changed. However the speed or flank steepness of the received signal is simultaneously adjusted with this and this has unwanted effects on the measured distance with many time of flight methods. A further measure also with a respectively given sensitivity of the light receiver is the setting of the exposure time or of the point in time of the detection (gating). This is likewise problematic in time of flight processes since a speed change of the received signal can hereby result. In addition, particularly with highly integrated light receivers, the named parameters are often not accessible at all and the reconfiguring of the sensor parameters requires time.

It is furthermore conceivable to use mechanical shutters to adapt the power incident on the light receiver. This avoids said problems. The mechanical shutters, for instance iris shutters, are however, very sluggish so that the required adaptation of the shutter diameter brings along a latency time that is greater than the measurement rate of the sensor that is aimed for. In addition, the aimed-for shutter diameter is frequently not set with the required precision.

A situation-based adaptation of the light intensity is also possible at the transmission side. The power of the light transmitter is changed for this purpose. With pulse processes, the amplitude of the pulses is not necessarily varied for this purpose, but rather the pulse length or the pulse/pause ratio. With time of flight sensors, an adaptation of the transmission power or of the pulse behavior can in turn cause a change in the flank steepness and can change the measurement result. A change of the pulse/pause ratio is not even possible without difficulty in dependence on the measurement method since this ratio carries information for the time of flight measurement under certain circumstances. In addition, with pulsed operating modes having very high repetition frequencies, it can occur that the required reconfiguration brings about a latency time that is too slow for the aimed-form measurement rate of the sensor. Specific performance levels are standardized in EN 13849 and safety integrity levels (SILs) are standardized in EN 61508 for sensors that are used in safety engineering for monitoring a hazard source and that bring it into a safe state on recognition of a hazard. The observation of said levels during reconfiguration too can require a check with time-consuming test routines.

A transmission optics or reception optics having optical elements such as lenses is provided in practically every optical sensor. This optics is frequently focused to a specific distance or distance range with the aid of a focal adjustment in that the position of the lenses and thus the back focal length of the transmission optics or reception optics is adjusted electromechanically or optomechanically. Alternatively, liquid lenses are also known that directly change the focal length for a focal adjustment.

In a further development of liquid lenses for focal adjustment, EP 2 071 367 A1 proposes also varying the tilt of the liquid lens by applying different voltages in the peripheral direction. In a camera, this serves to prevent a recording of blurred images in that the camera's own movement is determined and the liquid lens is tilted to counteract this movement.

A further optoelectronic sensor having a liquid lens is disclosed in DE 10 2005 015 500 A1 whose beam shaping properties is asymmetrically variable by an asymmetrical frame or by different electrical potentials at separate electrodes of the lens frame. However, the document does not then explain the purpose for which this can be used.

SUMMARY

Against this background, it is the object of the invention to be able to use an optoelectronic sensor in a variable measurement environment.

This object is satisfied by an optoelectronic sensor and by a method for detecting object information in accordance with the respective independent claim. A light spot is generated on a light receiver by means of a reception optics and the corresponding received signal is evaluated. The invention now starts from the basic idea of providing that the portion of the light spot that is incident on the light receiver varies for a dynamic adjustment by a specific maladjustment. The level of the received signal changes accordingly. A manipulation unit is provided for this purpose that varies the reception optics, the light receiver and/or elements of the reception optics. A physical manipulation is meant by this, that is a movement or a deformation. The reception optics and/or the light receiver is/are preferably moved to change the relative location. In this context, location generally means a 6D location with a position and rotary position, with at least one of these degrees of freedom being manipulated. Alternatively or additionally, elements of the reception optics or optically active surfaces are manipulated, either by displacement, tilting or deformation.

The manipulations have the effect of a change of the location, size and/or geometry of the light spot. A certain portion of the light spot is incident on the light receiver and a remaining portion is not incident via manipulation of the location. A more or less pronounced irradiation over the surface of the light receiver can be provided via the size. An example for a geometry change with an effect on the portion of the light spot incident on the light receiver is a deformation from a circle to an ellipse that then also no longer fits on the light receiver with the same surface area. The effects of the manipulation can be combined, for instance when a size change is not a direct scaling, but rather accompanies a deformation of the light spot.

A maladjustment can initially only reduce the level of the received signal. The invention can, however, also be used to increase the sensitivity. Care is already taken in a basic state of the sensor for this purpose that the light spot is not completely incident on the light receiver. A reserve is thereby created that can be used by a corresponding manipulation.

The invention has the advantage that the dynamic range can be expanded by a well-defined maladjustment. The least favorable case no longer has to be assumed in the energy balance due to the specific adaptation. The measurement accuracy is maintained in this respect; the change of the flank steepness that is unfavorable in a time of flight method in particular does not take place while an overmodulation or saturation is avoided. Despite limited dynamics of the light receiver, the sensor can be adapted on a situation basis to the respective prevailing environmental conditions and can be ideally used without having to reconfigure the light receiver or a light transmitter. The measures in accordance with the invention can also be made when an influence on the transmitted light power or operating parameters of the light receiver is not possible or when these possibilities have already been exhausted. Since there are fewer situations in which measurements are not possible, the availability of the sensor is also increased, which is in particular of great importance in safety engineering. The solution in accordance with the invention can be implemented in a very compact manner with dimensions of a few millimeters. Manipulations can take place at high frequencies that in particular cover a typical measurement frequency of 10-500 Hz.

The sensor preferably has a light transmitter whose light generates the light spot. This can be done in a direct way as with a through-beam sensor or after a simple or multiple reflection at objects or reflectors. The light transmitter or its transmission optics can also be manipulated to obtain a light spot on the light receivers that is changed in location, size and/or geometry with otherwise unchanged conditions. However, this also influences the measurement. A wider transmitted light beam, for example, illuminates additional part regions of the monitored zone and increases the visual range of the reception optics. Objects can thereby influence the measurement that would have no effect on the transmitted light beam without the manipulation and the object resolution additionally worsens.

The manipulation unit is preferably configured to set the portion of the light spot in accordance with a damping factor. A model, a table or the like is accordingly stored that links the extent of the manipulations to the portion of the light spot that is incident on the light receiver and additionally to a damping factor. As already noted, the damping factor can also be greater than one when the light spot is already only partly incident on the light receiver in a base state of the sensor. The link between the desired damping factor and the manipulation required therefor can also take place in the evaluation unit. The corresponding evaluation functionality is then understood as part of the manipulation unit even though the actual manipulation unit is purely an actuator system.

The evaluation unit is preferably configured for a level measurement of the received signal. For this purpose, for example, the maximum amplitude is determined or the integral of received pulse with a pulsed system. It can be determined by the level measurement whether the received signal is too weak or is overmodulated and optionally a reaction can be made by means of the manipulation unit. The portion of the light spot that is incident on the light receiver is one of a plurality of factors that determines the level.

The evaluation unit preferably has a regulation to keep the level in a modulation range. The specific maladjustment in accordance with the invention by means of the manipulation unit is used to keep the received signal in a dynamic range detectable by the light receiver. The modulation range can correspond to the maximum dynamic range of the light receiver or can also be considerably smaller down to a target value. A respective regulation to the level of the preceding measurement particularly preferably takes place. This, for example, provides similar received pulses in a pulse method. In a base state, the sensor is adapted by construction, parameterization, teaching, adjustment and the like such that the level for a desired application, in particular the distance and remission of objects, is in the detectable dynamic range. The regulation provides that this is also the case with changed environmental conditions. A conclusion can be drawn from the setting of the manipulation unit, in particular from the specification of the regulation in the regulated state as to which portion of the light spot is incident on the light receiver and how large the level of the total light spot would therefore be. This is, for example, interesting as a currently available reserve with respect to objects further remote or remitting less strongly.

The evaluation unit is preferably configured to carry out a measurement multiple times with different portions of the light spot incident on the light receiver set by means of the manipulation unit. Instead of a regulation, provision is made here by means of the manipulation unit that a respective low portion and high portion of the light spot is incident on the light receiver according to which measurement takes place with low and high sensitivity. One or more intermediate steps are naturally also conceivable. The evaluation then has more measurement information and can, for example, average the measurements or properly modulated measurements can be picked. Instead of traveling discretely to the respective positions of the manipulation unit, a periodic manipulation can also take place, for instance by a sine, and a measurement can then be made at different settings via a corresponding time offset.

The manipulation unit is preferably configured for a focal adjustment of the reception optics, a lateral displacement and/or a tilting. These measures result individually or in combination in the desired effect on the light spot. A focusing or rather a defocusing is particularly well-suited for systems with short focal lengths. A small adjustment is namely then already enough to obtain a satisfactory result. The relevant effect of a lateral displacement is the relative position so that the reception optics, the light receive or both can be displaced. A tilt also provides that the light receiver is missed by a desired portion on a lateral displacement. The reception optics, one of its elements or optically effective surfaces or the light receiver can be tilted.

The manipulation unit preferably has a moving coil or a pizeoactuator. A displacement along the optical axis, that is a defocusing, or a displacement laterally is thus possible depending on the embodiment in that the moving coil or the piezoactuator manipulates the corresponding axis. A manipulation over a plurality of optics is also conceivable.

The manipulation unit preferably has an adaptive lens. The just named manipulation units can change the back focal length, optionally also the focal length of a multi-lens system. An adaptive lens in contrast directly adjusts the curvature of its optically effective surfaces and thus its focal length, and indeed very fast within milliseconds. Such adaptive lenses are robust, reliable, stable with respect to vibration and over a long time, offer a sufficient optical quality for different wavelengths, require only a minimal power consumption, and have no moving parts.

The adaptive lens is preferably a liquid lens or a gel lens. Such lenses provide the desired focusing possibility and are very small in construction and inexpensive in this respect. The adaptive lens is even more preferably also tiltable. This relates to the optical effect that allows an incident light beam to exit in an adjustable direction. The adaptive lens has control elements segmented in the peripheral direction for this purpose, for example. They can be segmented electrodes that control a liquid lens via the electrowetting effect. Segmented actuators, in particular piezoactuators, are furthermore conceivable which locally vary the pressure on a liquid and thereby differently curve a membrane on liquid or which directly deform a gel-like substance of the lens. A non-rotationally symmetrical influencing of the lens which results in the optical tilt is made possible by the segmentation in the peripheral direction.

A further alternative to moving coils, piezoactuators or liquid lenses are other actuator systems to displace or tilt an element on an axis. Micromirrors (DMDs, digital micromirror devices) are also possible, but are comparatively expensive.

The light receiver is preferably configured as an array with a plurality of light reception elements and the manipulation unit is configured for a displacement or deformation of the light spot transversely to the array. The manipulation should naturally where possible not result in crosstalk between the light reception elements since this falsifies the measurement. However, there is space transversely to the array to provide that portions of the light spot miss the respective light reception element. The design possibilities for the manipulation unit are the same apart from the preferred direction transversely to the array. The preferred direction can inter alia be achieved by limiting a lateral displacement or tilt to a direction or deformation or defocusing by cylindrical lenses.

The light receiver is preferably designed as a matrix of light reception elements and the reception optics has a microlens field. Not all manipulations are suitable here; but at least a lateral displacement and also a defocusing by a distance change are possible. The scope for manipulations is also smaller. The fill factor, i.e. the ratio of the light-sensitive area to the total area of the pixels, however, does not reach 100% in a matrix light receiver. There are therefore dead regions in which at least certain light portions can be directed by maladjustment without the received light being incident on other light reception elements.

The method in accordance with the invention can be further developed in a similar manner and shows similar advantages in so doing. Such advantageous features are described in an exemplary, but not exclusive, manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
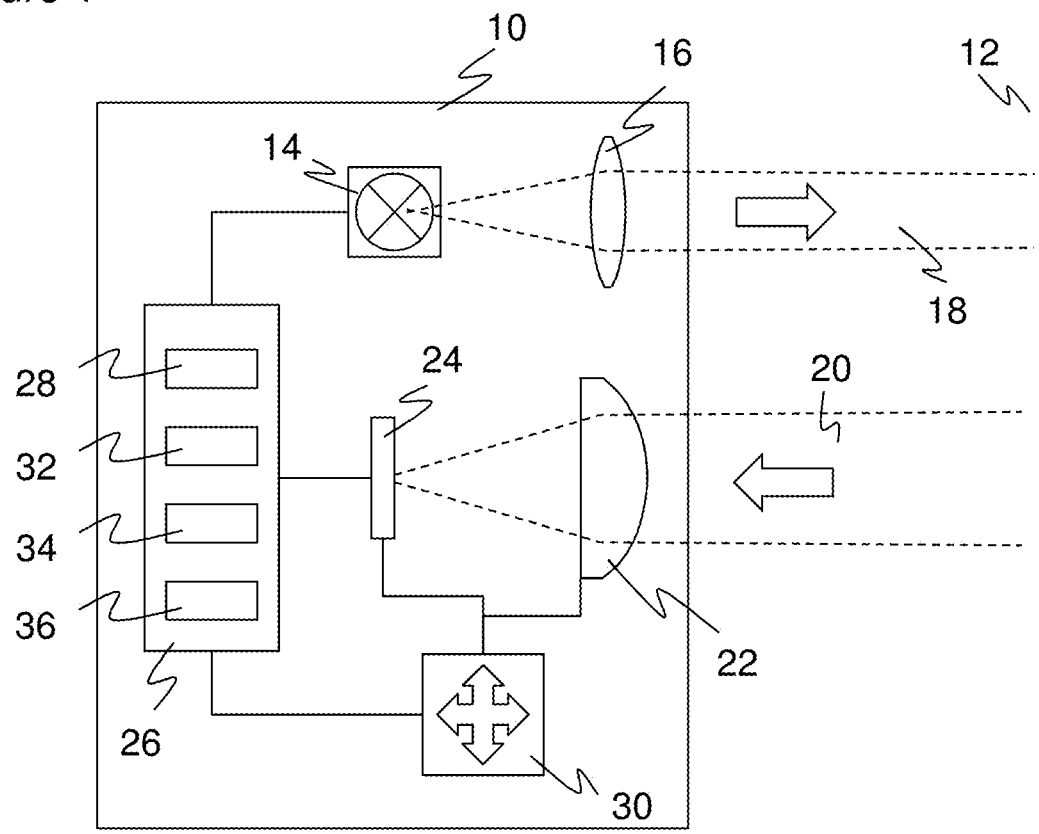
FIG. 1 a schematic sectional illustration of a sensor with the possibility of a specific maladjustment.

FIG. 1 shows a schematic sectional representation of an optoelectronic sensor 10 for detecting object information from a monitored zone 12. A light transmitter 14, for example an LED or a laser, transmits a light beam 18 into the monitored zone 12 via a transmission optics 16. The light beam 18 can be collimated as shown, but can also be focused to a specific distance or can conversely be a divergent bundle of beams.

If the light beam 18 is incident on an object or a reflector in the monitored zone 12, a remitted light beam 20 returns that is directed by a reception optics 22 to a light receiver 24. The reception optics 22 is shown as a simple lens, with it being able to be an asphere or a free-form surface. Optical systems of a plurality of lenses, including single cylinder lenses, or multiple cylinder lenses, in particular crossed cylinder lenses or with other optical elements such as shutters, prisms, mirrors or the like are also possible, however. Individual lenses or a plurality of lenses that are involved can be adaptive lenses with a variable focal length. The reception optics 22 can also be reflective overall and can in particular have moving mirrors or micromirrors. The same applies accordingly to the transmission optics 16.

An optical semiconductor diode that converts the photons received by the internal photo effect into an electric current preferably serves as a light receiver 24. Photodiodes (PDs), avalanche photodiodes (APDs) or single photon avalanche photodiodes (SPADs) and similar reception elements can be considered for this purpose. In this respect, such a single optical semiconductor diode per se has no spatial resolution capability; its output signal only provides information on the received light quantity. The spatial resolution can, however, be achieved by a linear or matrix-shaped light receiver of a plurality of such optical semiconductor diodes.

The remitted light beam 20 generates a light spot on the light receiver 24 and thereby an electrical received signal. An evaluation unit 26 is connected to the light receiver 24 and evaluates the received signal in an object detection unit 28 to acquire object information. The evaluation unit 26 simultaneously takes over a control functionality and is connected to the light transmitter 14. A simple evaluation only recognizes the presence or absence of an object in a binary manner. The sensor 10 is preferably configured to measure distance. For this purpose, the transmitted light beam 18 is modulated by short pulses whose transit time from transmission up to reception in the light receiver 24 is determined. Alternatively, an oscillation is modulated and the time of flight is measured over the phase offset.

A manipulation unit 30 is furthermore provided in the reception path for a specific defocusing so that a different portion of the light spot is incident on the light receiver 24. For this purpose, the manipulation unit 30 preferably acts on the reception optics 22, alternatively or additionally on the light receiver 24, to change the location, rotary position or shape of the whole element or at least of an optically effective boundary surface. Possible embodiments of the manipulation unit 30 and its effect on the light spot will be explained in more detail below with reference to FIGS. 2 to 4.

In a corresponding manner to the manipulation unit 30, a manipulation control 32 is provided in the evaluation unit 26. The required parameters and commands for the manipulation unit 30 are thereby generated for a desired portion of the light spot that should be incident on the light receiver 24. The manipulation unit 30 can, deviating from the representation, act on the light transmitter 14 or on the transmission optics 16.

It is the object of a level measurement 34 to determine the intensity of the light in the light spot incident on the light receiver 24 using the received signal. The received signal, for example its integral or extreme values, is preferably evaluated for this purpose. The level measurement 34 in particular recognizes when the light receiver 24 overmodulates or the received signal is so weak that it is lost in the noise, which can be recognized by a set noise threshold or by a comparison with the received signal without a light spot. Which portion of the light spot is respectively incident on the light receiver 24 is also known since it is set via the maladjustment by means of the manipulation unit 30. The total level for the whole light spot can also be extrapolated from this including the portions that miss the light receiver 24.

A regulation 36 uses the result of the level measurement as an input value to keep the received signal in a modulation range with the aid of the manipulation unit 30. The light receiver 24 and the further electronics in the reception path, for instance a gain circuit, can already process a certain dynamic range. Received signals that are too strong or too weak for this dynamic range are prevented by the regulation 36. It is also possible not only to keep the received signal in the modulation range, but rather always regulate it to a fixed level, in particular to that of the last evaluated received signal. A measurement error due to different pulse shapes or pulse levels is thereby avoided in pulse time of flight processes. A conventional correction for systematic measurement differences due to remission changes that effect a change of the flank steepness, for example, is then not necessary.

The evaluation unit 26 in accordance with FIG. 1 comprises the just-addressed object detection unit 28, manipulation unit 32, level measurement 34, and regulation 36. This is to be understood in a purely functional manner. The manipulation unit 30 can, for example, not only be the actuator system, but the control functionality from a module of the evaluation unit 26 can also be moved there. The actual implementation can take place overall in one or more digital modules and circuits such as a microprocessor, an FPGA (field programmable gate array) or an ASIC (application-specific integrated circuit).

FIG. 1 shows a sensor 10 that is configured as a one-dimensional scanner. It is only a schematic diagram that is representative for a plurality of sensors that profit from the dynamic adaptation in accordance with the invention. The optical paths can be varied first, for example by a collinear design with a beam splitter. The light transmitter 14 can be provided in its own housing and also at a distance as with a through-beam sensor and the sensor 10 can also manage without a light transmitter 14. The light receiver 24 can be configured as a receiver array, for example to measure distances using the triangulation principle or in that the sensor 10 as a background-suppression scanner (BGS scanner) only reacts to objects in a specific distance range. A matrix receiver is also conceivable. A not only three-dimensional monitored zone is also made possible by a further development as a light grid or as a light scanner. All these sensors 10 can also be configured as safe sensors in the sense of safety standards such as the already named EN 13849.

Figure 2:
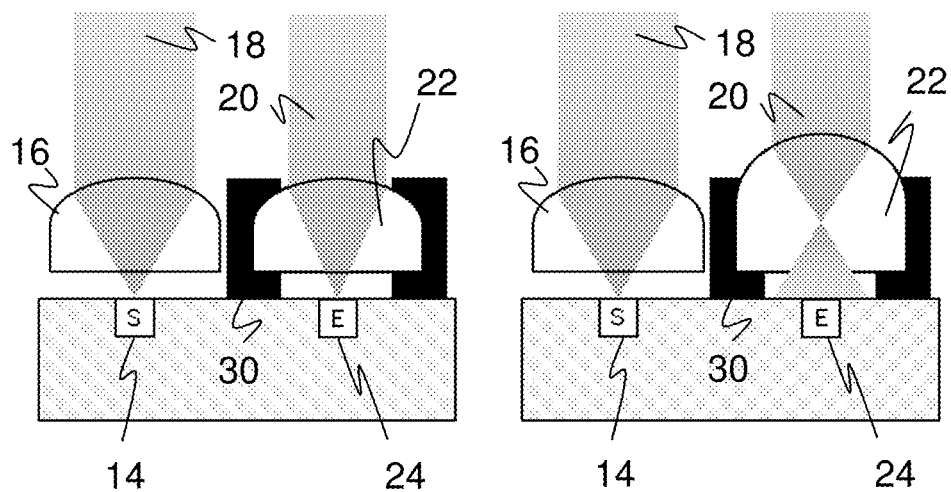
FIG. 2 a schematic representation of a transceiver unit and of its beam path to explain a specific defocusing by means of a liquid lens.
Figure 3:
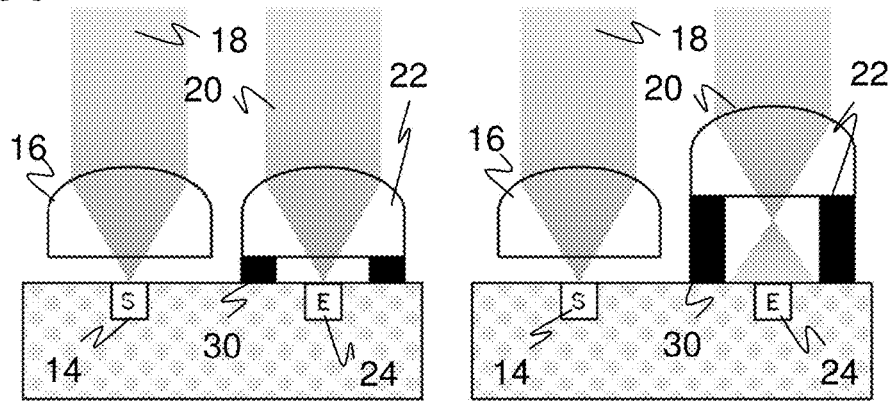
FIG. 3 a schematic representation corresponding to FIG. 2 to explain a specific defocusing by means of an actuator system changing the back focal length.
Figure 4:
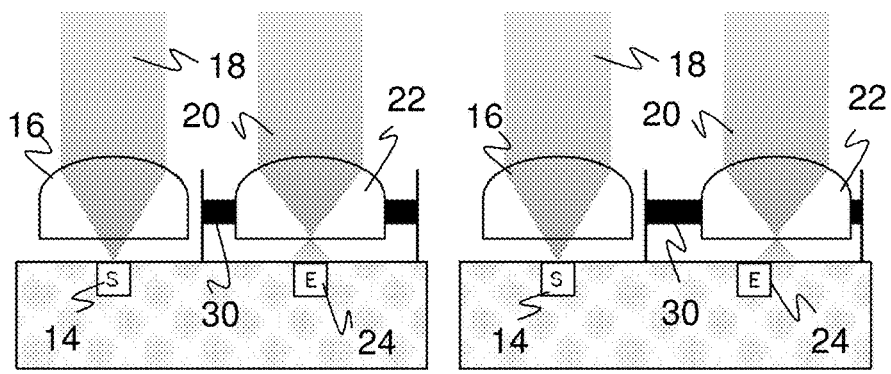
FIG. 4 a schematic representation corresponding to FIG. 2 to explain a specific lateral displacement of the light spot.

FIGS. 2 to 4 explain some possibilities how the manipulation unit 30 can achieve that only a desired portion of the light spot is incident on the light receiver 24 and thus the received signal generated by less light is attenuated. The controlled maladjustment of the optical components 22, 24 in the reception path can be achieved in different manners. One possibility is (auto)defocusing along the optical axis that is shown in two exemplary embodiments in FIGS. 2 and 3. Another possibility is the lateral displacement of the light spot that is achieved in an embodiment in accordance with FIG. 4 by lateral displacement of the reception optics 22. The lateral displacement of the light spot can also be achieved by a tilting of the reception optics or of an optically active area. Since it is the relative position that is important, the light receiver 24 can additionally or exclusively be moved in other embodiments.

The manipulation unit 30 can use different technologies for a well-defined maladjustment. Adaptive lenses, in particular liquid lenses or gel lenses offer a first possibility. A lens contour can be varied via an electric control in such adaptive lenses, whereby the focal length is adjusted within microseconds. In addition, there are adaptive lenses that also enable an asymmetrical shape change and thus effectively a tilting that can be utilized for a lateral displacement of the light spot. Such adaptive lenses will be explained further below with reference to FIG. 5.

All the actuators that are capable of a fast displacement on at least one axis provide a further possibility. Fast means that the manipulation is preferably fast enough for a measuring rate of the sensor 10 of, for example, 10-500 Hz. A piezo-actuator forms one example for this. The elastic expansion or contraction of a piezoelectric material can be directly brought about therein by application of an electric voltage tanks to the piezoelectric effect. A moving coil (voice coil) can be named as a further example.

FIG. 2 shows a schematic representation of the optical path of the light transmitter 14 and light receiver 24 to explain the dynamic adaptation by defocusing a reception optics 22 using an adaptive lens or specifically a liquid lens whose focal length can be adjusted by the manipulation unit 30. The difference from the representation of FIG. 1 is only intended to serve for a better illustration and not to imply any special technical properties. The monolithic transceiver unit shown is therefore only an example; the light transmitter 14 and the light receiver 24 can also be separate and the remitted light beam 20 can be of practically any origin, also without a light transmitter 14.

The transmission optics 16 here comprises by way of example a single transmission lens that can have different designs as a spherical lens, an aspherical lens or as a free-form lens. The entry surfaces and exit surfaces can be convex, concave or planar. The transmission lens is preferably ideally adapted to the measurement task. The transmission lens can be manufactured from glass or plastic. The latter additionally allows more design latitude for optomechanical work since, for example, holding apparatus can be injection molded directly from plastic.

In the case of sufficient optical performance, the reception lens of the reception optics 22, a single reception lens by way of example here, does not have to any ideally adapted lens contour since then an etendue maximization is not compulsory. In this case, a liquid lens whose lens contour can be electronically adapted can be used as the reception lens.

An adjusted setting is now shown at the left in FIG. 2 that is suitable for a low to medium received light power. This then results in a modulation of the light receiver 24 whose dynamic range is sufficient to this extent. The reception optics 22 is specifically defocused by a focal length adaptation at the right in FIG. 2. This setting takes place at a high to very high mean received light power. The light spot increases due to the changed focal position, and indeed to a degree such that only a portion is incident on the light receiver 24. The irradiation amount incident on the light receiver 24 can thus be directly controlled by defocusing. It is thereby possible to adapt the light receiver 24 together with the associated electronics with a limited dynamic range in a situation-based manner to the respective prevailing environmental conditions and to use it in an ideal manner without having to reconfigure the light transmitter and/or light receiver. The defocusing also results in a modulation of the light receiver 24 for higher mean received light powers.

FIG. 3 shows a schematic representation of the optical path of the light transmitter 14 and the light receiver 24 similar to FIG. 2; however, here a defocusing is not achieved by an adaptive lens, but rather by an adjustment of the back focal length.

The dynamic adaptation or the power regulation principle is analogous. The adjusted setting is shown at the left in FIG. 3 that is suitable for a low to medium received light power and that results in a modulation of the light receiver 24. The reception optics 22 at the right in FIG. 3 is defocused at a high to very high mean reception poser by movement along the optical axis and this also results in a modulation of the light receiver 24.

Adaptive lenses cannot be used for space or modulation reasons under certain circumstances. Both the transmission lens and the reception lens should in particular be ideally adapted to the measurement task under particularly challenging environmental conditions. A dynamic adaptation by deformation of the lens contour such as in a liquid lens is then less suitable since the reception lens in this respect loses its ideal adaptation. An ideally adapted reception optics 22 is therefore maintained here and the manipulation unit 30 for a defocusing is, for example, a piezoactuator or a moving coil that adjusts the spacing between the reception optics 22 and the light receiver 24.

FIG. 4 shows a further conceivable manipulation with a lateral displacement of the light spot. The representation, possible designs and environmental conditions are otherwise explained as with reference to FIGS. 2 and 3. In the example shown in FIG. 4, the reception optics 24 is laterally displaced, for instance by a piezoactuator or by a moving coil. Some alternative possibilities to displace the light spot have already been named above. An optical element can be tilted for this purpose, for instance a mirror, also a micromirror, a prism, a lens or only the lens contour of an adaptive lens. The light receiver 24 can also alternatively or additionally be displaced or tilted.

The light is directly led past the light receiver 24 in part due to the lateral maladjustment and thus a movement of the light spot for a dynamic adjustment at the same focal position. The focal position can additionally be manipulated, either by an adaptive lens or by manipulation of the back focal length and a then possibly ideally adapted reception optics 22. An overmodulation of the light receiver 24 is avoided by the partial illumination.

An adjusted setting is again shown at the left in FIG. 4 that is suitable for a low to medium received light power and that results in a modulation of the light receiver 24. At the right in FIG. 3, the reception optics 22 provides by a lateral maladjustment at a high to very high mean reception power that only a part of the light spot is incident on the light receiver 24 and the remaining part misses it in order thus to still achieve a modulation of the light receiver 24.

The possibilities of maladjustment described with reference to FIGS. 2 to 4, that is the defocusing and the lateral displacement with different means, can be combined with one another. If the maladjustment is not yet sufficient under particularly demanding environmental condition to give the modulation of the light receiver 24 an ideal form, combinations with other measures are also conceivable such as adaptations to the light transmitter 14, in particular its light power or, in pulse operation, the pulse amplitude, pulse length and/or pulse repetition frequency, or further adaptations to the light receiver 24 that do not affect the optical reception path, but rather the electronics, for instance gain, bias particularly with SPADs or gating windows.

The regulation 36 preferably provides that the respective suitable maladjustment is precisely set via the manipulation unit 30. A calibration of the optical irradiation power incident on the light receiver is advantageous. It is possible to regulate to the signal level of the previous measurement that can be output directly as a measured value by some light receivers 24 and can otherwise be determined via the level measurement 34.

Figure 5:
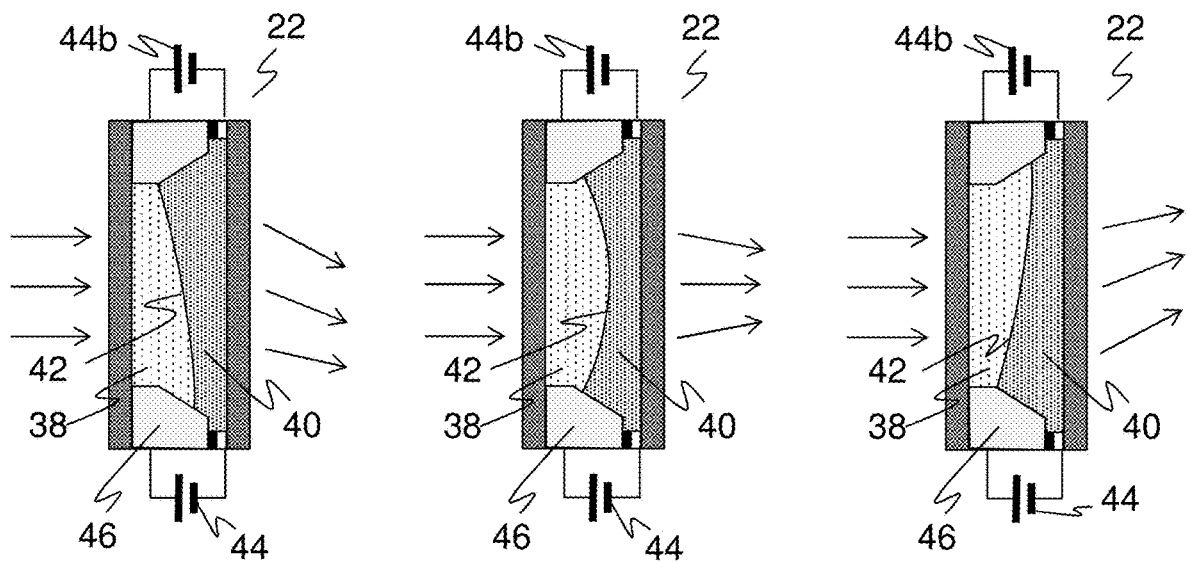
FIG. 5 representations of a tiltable liquid lens that changes the direction of an exiting light beam with respect to an incident light beam.

Finally, some embodiments of an adaptive lens will be explained with reference to FIG. 5 of which embodiments one or more can be arranged as a manipulable optical component in the reception optics 22 or also in the transmission optics 16. The adaptive lens shown is a liquid lens in accordance with the electrowetting effect. There are also other adaptive lenses, for instance with a liquid chamber and a membrane that covers it and whose arching is varied by pressure on the liquid, or lenses with a gel-like optically transmitting material that is mechanically deformed by an actuator system.

The liquid lens has two transparent, non-miscible liquids 38, 40 having different refractive indices and having the same density. The shape of the liquid boundary surface 42 between the two liquids 38, 40 is used for an optical function. The activation is based on the principle of electrowetting which shows a dependence of the surface tension or of the boundary surface tension on the applied electrical field. It is therefore possible to vary the shape of the boundary layer 42 and thus the optical properties of the liquid lens by an electric control at a terminal 44a-b, whereby corresponding voltages are applied to an electrode 46.

Such control voltages can rotationally symmetrically change the contour of the boundary layer 42 and can set the focal length via it, depending on the construction shape even up to a concave boundary layer 42, that is a divergent behavior. The tilt of the liquid lens can, however, also be influenced, which is based on non-rotationally symmetrically applied voltages and thus on electric fields. The boundary layer 42 is accordingly non-rotationally symmetrically deformed, which is utilized for the tilt. FIG. 5 shows at the left a tilting of the liquid lens to the bottom; at the middle a rotationally symmetrical setting without a tilt for a comparison; and at the right a tilting to the top. In this respect, the direction of the tile in each case relates to the optical effect, that is the direction in which a light spot migrates over the light receiver 24. The tilt can respectively have a (de)focusing superposed on it by a corresponding curvature of the boundary surface 42.

The invention claimed is:

1. An optoelectronic sensor for detecting object information from a monitored zone having:
   a light receiver;
   a reception optics associated with the light receiver for generating a light spot on the light receiver;
   an evaluation unit for generating the object information from a received signal of the light receiver,
   a manipulation unit to vary at least one of the reception optics, the light receiver and elements of the reception optics by performing a dynamic adjustment by a specific maladjustment changing at least one of the location, size and geometry of the light spot, thus varying a portion of the light spot that is incident on the light receiver and a remaining portion of the light spot that is not incident on the light receiver for a dynamic adjustment of the level of the received signal,
   wherein the manipulation unit is configured to set the portion of the light spot in accordance with a damping factor.

2. The sensor in accordance with claim 1,
that has a light transmitter whose light generates the light spot.

3. The sensor in accordance with claim 1,
wherein the evaluation unit is configured for a level measurement of the received signal.

4. The sensor in accordance with claim 1,
wherein the evaluation unit has a regulation to keep the level measurement of the received signal in a modulation range.

5. The sensor in accordance with claim 1,
wherein the evaluation unit is configured to carry out a measurement multiple times with different portions of the light spot incident on the light receiver set by means of the manipulation unit.

6. The sensor in accordance with claim 1,
wherein the manipulation unit is configured for at least one of a focal adjustment of the reception optics, a lateral displacement and a tilt.

7. The sensor in accordance with claim 1,
wherein the manipulation unit has a moving coil or a piezoactuator.

8. The sensor in accordance with claim 1,
wherein the manipulation unit has an adaptive lens.

9. The sensor in accordance with claim 8,
wherein the manipulation unit has a liquid lens.

10. The sensor in accordance with claim 1,
wherein the light receiver is configured as an array with a plurality of light reception elements and the manipulation unit is configured for a displacement or deformation of the light spot transversely to the array.

11. The sensor in accordance with claim 1,
wherein the light receiver is configured as a matrix of light reception elements and the reception optics has a microlens field.

12. A method of detecting object information from a monitored zone in which a reception optics generates a light spot on a light receiver and a received signal of the light receiver is evaluated to acquire the object information,
   wherein at least one of the reception optics, the light receiver and elements of the reception optics are varied by performing a dynamic adjustment by a specific maladjustment to change at least one of the location, size and geometry of the light spot, thus varying a portion of the light spot that is incident on the light receiver and a remaining portion of the light spot that is not incident on the light receiver for a dynamic adjustment of the level of the received signal,
   wherein a manipulation unit is configured to set the portion of the light spot in accordance with a damping factor.

* * * * *

UNITED STATES PATENT AND TRADEMARK OFFICE
CERTIFICATE OF CORRECTION

PATENT NO. : 10,634,785 B2  
APPLICATION NO. : 15/815982  
DATED : April 28, 2020  
INVENTOR(S) : Christoph Hofmann, Joachim Kramer and Jorg Sigmund Page 1 of 1

It is certified that error appears in the above-identified patent and that said Letters Patent is hereby corrected as shown below:

On the Title Page

Item (71) Please delete and replace the Applicant City with the following:
(71) Applicant: SICK AG, Waldkirch (DE)

Signed and Sealed this  
Ninth Day of June, 2020

Andrei Iancu  
*Director of the United States Patent and Trademark Office*